United States Patent
Kobayashi (10) Patent No.: US 10,656,000 B2
(45) Date of Patent: May 19, 2020

(54) COMPONENT MOUNTING STRUCTURE FOR GAS METER AND GAS METER

(71) Applicant: Azbil Kimmon Co., Ltd., Tokyo (JP)

(72) Inventor: Tomoyuki Kobayashi, Tokyo (JP)

(73) Assignee: Azbil Corporation, Tokyo (JP)

( * ) Notice: Subject to any disclaimer, the term of this patent is extended or adjusted under 35 U.S.C. 154(b) by 146 days.

(21) Appl. No.: 15/949,631

(22) Filed: Apr. 10, 2018

(65) Prior Publication Data
US 2018/0292247 A1    Oct. 11, 2018

(51) Int. Cl.
*G01F 15/18*  (2006.01)
*G01F 15/14*  (2006.01)
*G01F 15/00*  (2006.01)

(52) U.S. Cl.
CPC ............ *G01F 15/18* (2013.01); *G01F 15/185* (2013.01); *G01F 15/005* (2013.01); *G01F 15/14* (2013.01)

(58) Field of Classification Search
CPC .......... G01F 1/662; G01F 15/14; G01F 15/18; G01F 15/185
See application file for complete search history.

(56) References Cited

U.S. PATENT DOCUMENTS

| | | | |
|---|---|---|---|
| 9,625,039 B2 * | 4/2017 | Endt | F16K 5/0642 |
| 9,891,082 B2 * | 2/2018 | Hausler | G01D 11/30 |
| 10,018,309 B2 * | 7/2018 | Christie | B21D 26/033 |
| 2015/0010348 A1 | 1/2015 | Takita et al. | |
| 2016/0320218 A1 | 11/2016 | Morihana et al. | |
| 2016/0370215 A1 | 12/2016 | Satou et al. | |

FOREIGN PATENT DOCUMENTS

| | | |
|---|---|---|
| CN | 102195155 A | 9/2011 |
| CN | 102954246 A | 3/2013 |
| CN | 104276074 A | 1/2015 |
| CN | 204692265 U | 10/2015 |
| CN | 105960576 A | 9/2016 |
| CN | 105980815 A | 9/2016 |
| JP | 2009-115496 A | 5/2009 |

OTHER PUBLICATIONS

The State Intellectual Property Office of People's Republic of China, "First Office Action", issued in Chinese Patent Application No. 201810315764.8, which is a counterpart to U.S. Appl. No. 15/949,631, dated Aug. 9, 2019, 12 pages (6 pages of English Translation of Office Action and 6 pages of Original Chinese Office Action).

Taiwan Intellectual Property Office, "Office Action and Search Report," issued in TW Patent Application No. 107108855, which is a Taiwan counterpart of U.S. Appl. No. 15/949,631, dated Nov. 20, 2018, 6 pages (2 pages of English Translation of Office Action, 3 pages of Original Office Action and 1 page of Original Search Report).

* cited by examiner

*Primary Examiner* — Justin N Olamit
(74) *Attorney, Agent, or Firm* — Amster, Rothstein & Ebenstein LLP (57) ABSTRACT

A shutoff valve adaptor and a measuring unit adaptor are resin members and each of them has an elastically deformable hooking claw. Each of sheet metal members has a hooking target portion. The shutoff valve adaptor is mounted to the sheet metal member by a snap-fit portion comprising the hooking target portion and the hooking claw hooked to the hooking target portion, and the measuring unit adaptor is mounted to the sheet metal member.

4 Claims, 8 Drawing Sheets

RELATED ART

Fig. 9

RELATED ART

Fig. 10

COMPONENT MOUNTING STRUCTURE FOR GAS METER AND GAS METER

CROSS-REFERENCE TO RELATED APPLICATION

The present application claims the benefit of and priority to Japanese Patent Application No. 2017-078230, filed on Apr. 11, 2017, the entire contents of which are incorporated by reference herein.

TECHNICAL FIELD

The present invention relates to a structure for mounting components in a gas meter.

BACKGROUND ART

As described in, for example, PTL 1, various components such as a shutoff valve are mounted in a gas meter.

Figure 8:
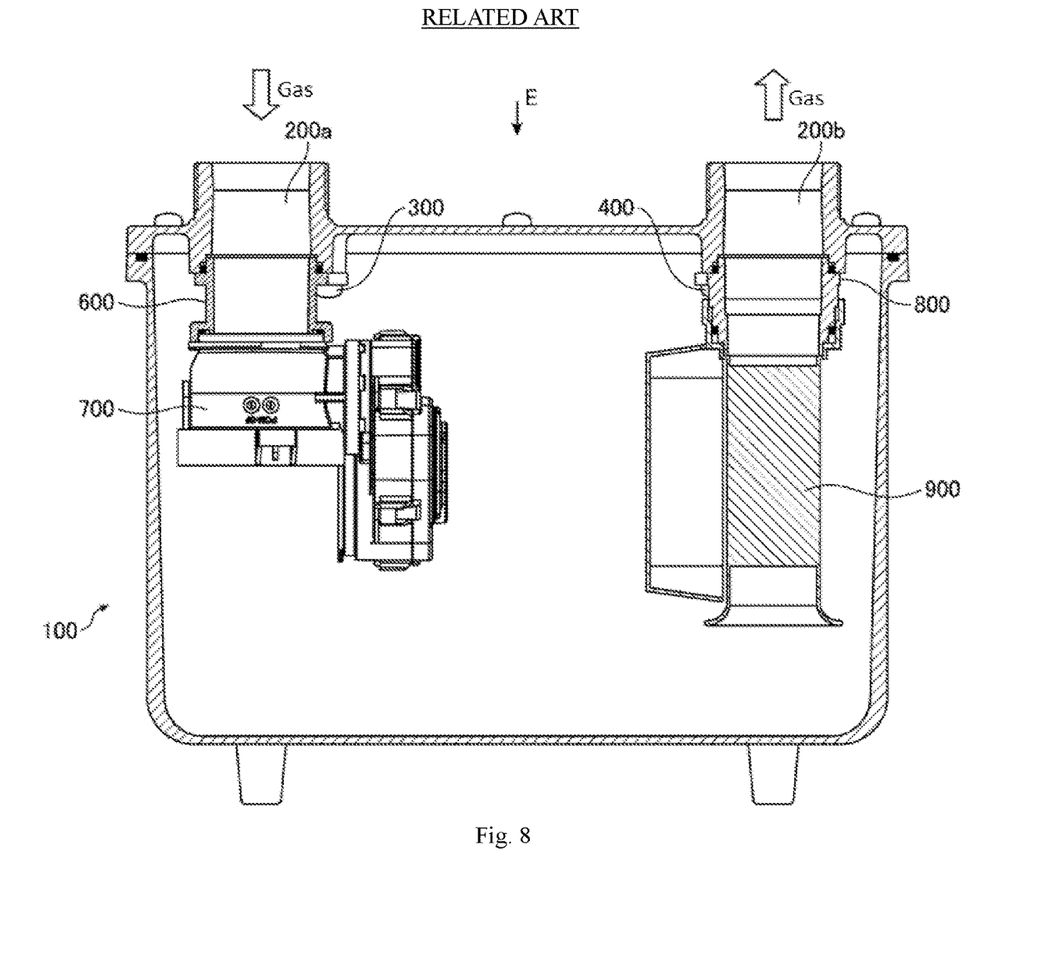
FIG. 8 is a cross-sectional view illustrating the conventional gas meter.

FIG. 8 is a cross-sectional view illustrating a conventional gas meter 100. The gas meter 100 is provided with an opening portion 200a used as an inflow port of gas and an opening portion 200b used as an outflow port of gas. A shutoff valve 700 is mounted to the opening portion 200a via a shutoff valve adaptor 600. A measuring unit 900 is mounted to the opening portion 200b via a measuring unit adaptor 800.

Figure 9:
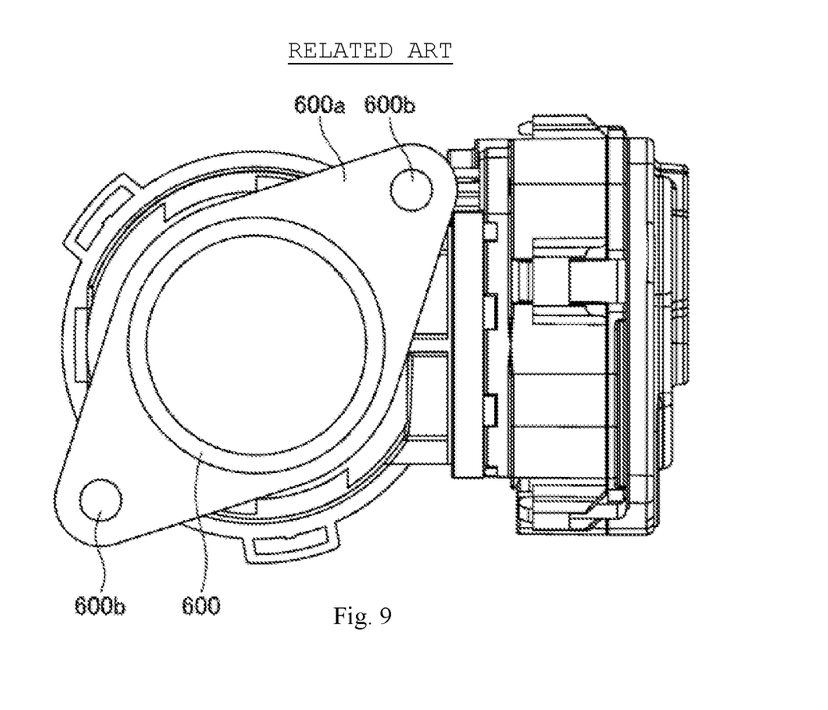
FIG. 9 is a plan view illustrating a shutoff valve adaptor and a shutoff valve mounted to the shutoff valve adaptor of the conventional gas meter.

FIG. 9 is a plan view illustrating the shutoff valve adaptor 600 and the shutoff valve 700 mounted to the shutoff valve adaptor 600 as seen from direction E in FIG. 8. A flange portion 600a of the shutoff valve adaptor 600 is provided with two through-holes 600b. The shutoff valve adaptor 600 is mounted to the opening portion 200a by screwing (a screw 300 as illustrated in FIG. 8) using these through-holes 600b.

Figure 10:
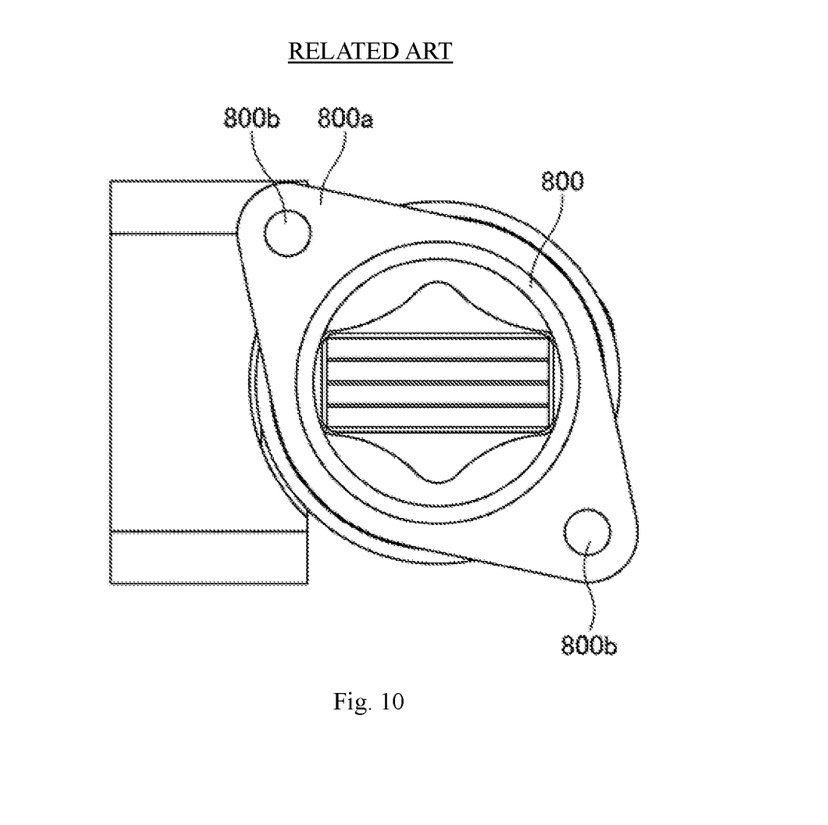
FIG. 10 is a plan view illustrating a measuring unit adaptor and a measuring unit mounted to the measuring unit adaptor of the conventional gas meter.

In addition, FIG. 10 is a plan view illustrating the measuring unit adaptor 800 and the measuring unit 900 mounted to the measuring unit adaptor 800 as seen from direction E in FIG. 8. A flange portion 800a of the measuring unit adaptor 800 is provided with two through-holes 800b. The measuring unit adaptor 800 is mounted to the opening portion 200b by screwing (a screw 400 as illustrated in FIG. 8) using these through-holes 800b.

CITATION LIST

Patent Literature

[PTL 1] JP-A-2009-115496

SUMMARY

Since the conventional gas meter is configured as described above and screwing is used, the number of components including screws and the number of processes concerning assembly increase, thereby requiring much effort for assembly.

The invention addresses the above problem with an object of providing a component mounting structure of a gas meter that reduces the effort of assembly.

A component mounting structure for a gas meter according to the invention comprises a resin member having an elastically deformable hooking claw; and a sheet metal member having a hooking target portion that is a peripheral edge portion of an opening portion connecting an inside and an outside of a gas meter, the hooking target portion being present on the inside of the gas meter, in which the hooking claw is hooked to the hooking target portion to form a snap-fit portion that mounts the resin member to the sheet metal member.

According to the invention, since the resin member is mounted to the sheet metal member by hooking the hooking claw of the resin member to the hooking target portion of the sheet metal member to form a snap-fit portion instead of screwing, the number of screwing positions is reduced and the effort of assembly is thereby reduced.

DETAILED DESCRIPTION

Embodiment 1

Figure 1:
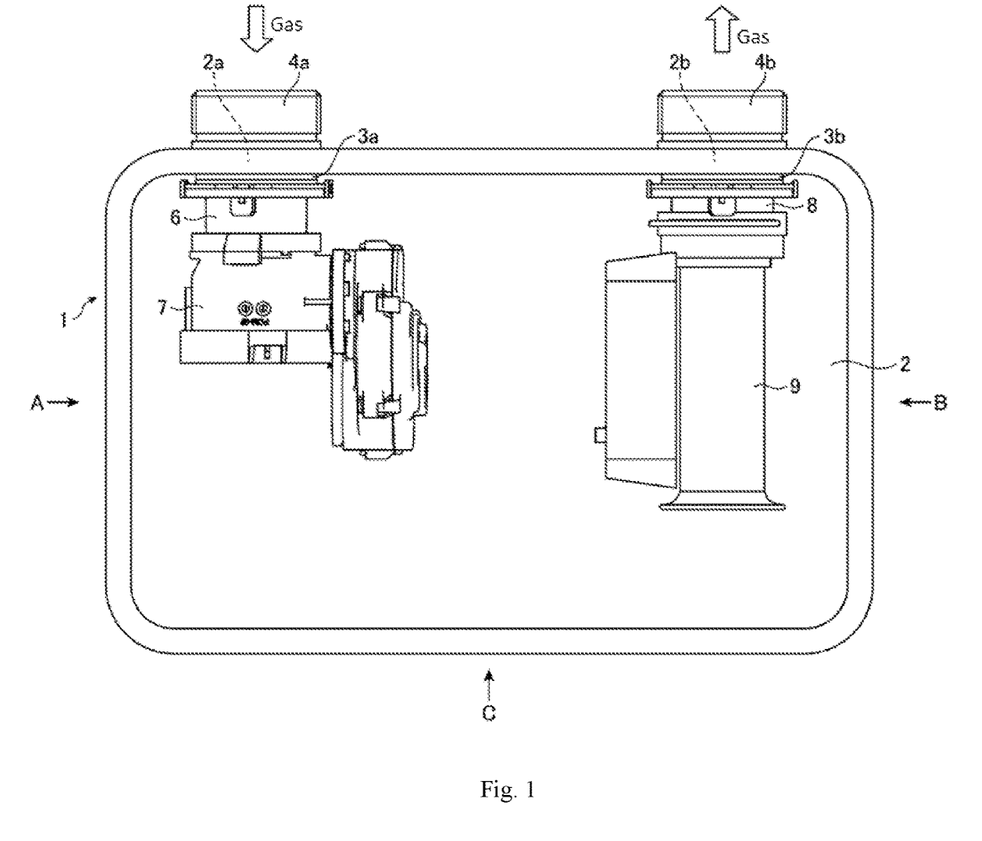
FIG. 1 is a front view illustrating a gas meter according to embodiment 1 of the invention.
Figure 2:
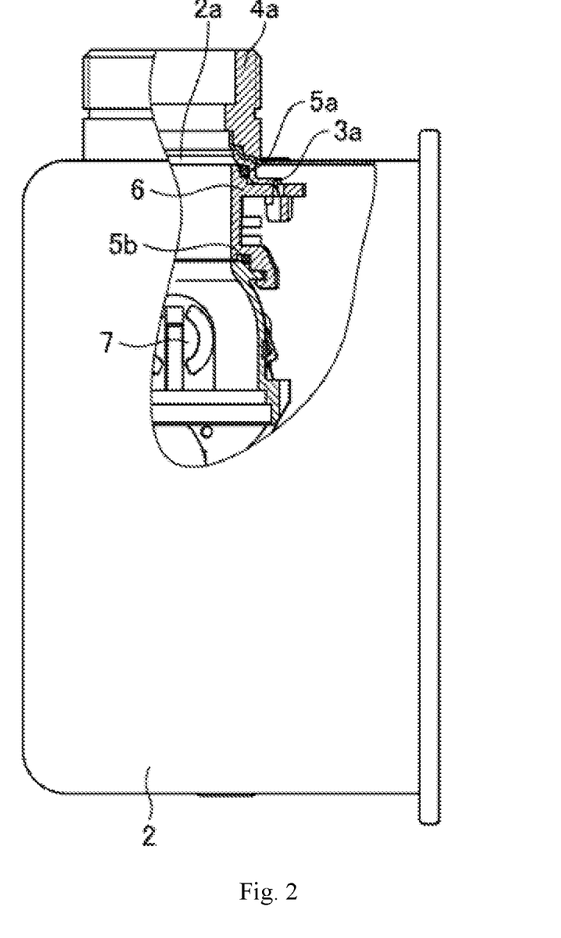
FIG. 2 is a side view illustrating the gas meter as seen from direction A in FIG. 1.
Figure 3:
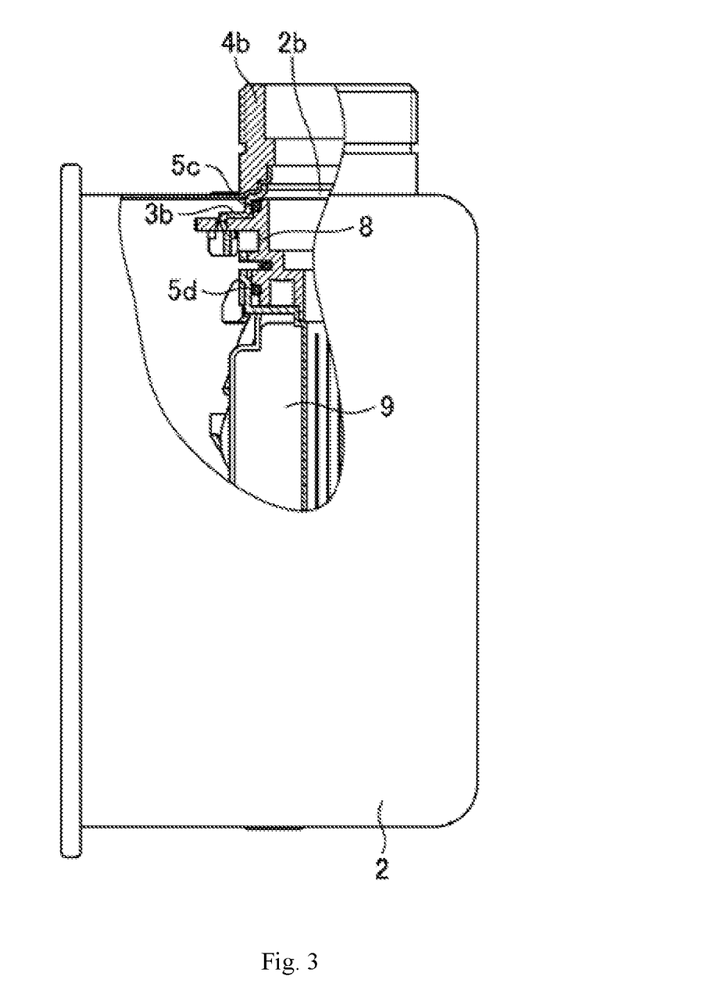
FIG. 3 is a side view illustrating the gas meter as seen from direction B in FIG. 1.

FIG. 1 is a front view illustrating a gas meter 1 according to embodiment 1 of the invention. FIG. 1 is a front view in which most of a case 2 is made transparent so that the interior of the gas meter 1 is visible. FIG. 2 is a side view illustrating the gas meter 1 as seen from direction A in FIG. 1. FIG. 2 illustrates the structure of the interior of the gas meter 1 as a cross section by making a part of the case 2 transparent. FIG. 3 is a side view illustrating the gas meter 1 as seen from direction B in FIG. 1. FIG. 3 illustrates the structure of the interior of the gas meter 1 as a cross section by making a part of the case 2 transparent. It should be noted that a controller for controlling the gas meter 1, a gas flow channel connecting a shutoff valve 7 to a measuring unit 9, and the like are not illustrated.

In the gas meter 1, the case 2 of metal that is substantially box-shaped is provided with opening portions 2a and 2b connecting the inside and the outside of the gas meter 1. The opening portion 2a is an opening portion used as the inflow port of gas. In addition, the opening portion 2b is an opening portion used as the outflow port of gas.

The part of the opening portion 2a on the inside of the gas meter 1 is provided with a sheet metal member 3a fixed to the case 2. The part of the opening portion 2a on the outside of the gas meter 1 is provided with a substantially cylindrical connection member 4a, used to connect a gas pipe (not illustrated), that is fixed to the case 2. A shutoff valve adaptor 6 is mounted to the sheet metal member 3a from the inside of the gas meter 1 with an O-ring 5a sandwiched therebetween, as illustrated in FIG. 2. The shutoff valve adaptor 6 is a substantially cylindrical resin member to which the shutoff valve 7 is connected. The shutoff valve 7 is mounted to the sheet metal member 3a and then the opening portion 2a via the shutoff valve adaptor 6. The shutoff valve 7 is closed during occurrence of an abnormality, such as gas leakage, to interrupt inflow of gas. An O-ring 5b is sandwiched between the shutoff valve adaptor 6 and the shutoff valve 7.

The part of the opening portion 2b on the inside of the gas meter 1 is provided with a sheet metal member 3b fixed to the case 2. The part of the opening portion 2b on the outside of the gas meter 1 is provided with a substantially cylindrical connection member 4b, used to connect a gas pipe (not illustrated), that is fixed to the case 2. A measuring unit adaptor 8 is mounted to the sheet metal member 3b from the inside of the gas meter 1 with an O-ring 5c sandwiched therebetween, as illustrated in FIG. 3. The measuring unit adaptor 8 is a substantially cylindrical resin member to which the measuring unit 9 is connected. The measuring unit 9 is mounted to the sheet metal member 3b and then the opening portion 2b via the measuring unit adaptor 8. The measuring unit 9 measures the flow rate of gas flowing in and, in embodiment 1, the measuring unit 9 may be a USM (Ultra Sonic Meter) gas meter that measures the flow rate using ultrasound. An O-ring 5d is sandwiched between the measuring unit adaptor 8 and the measuring unit 9.

Figure 4:
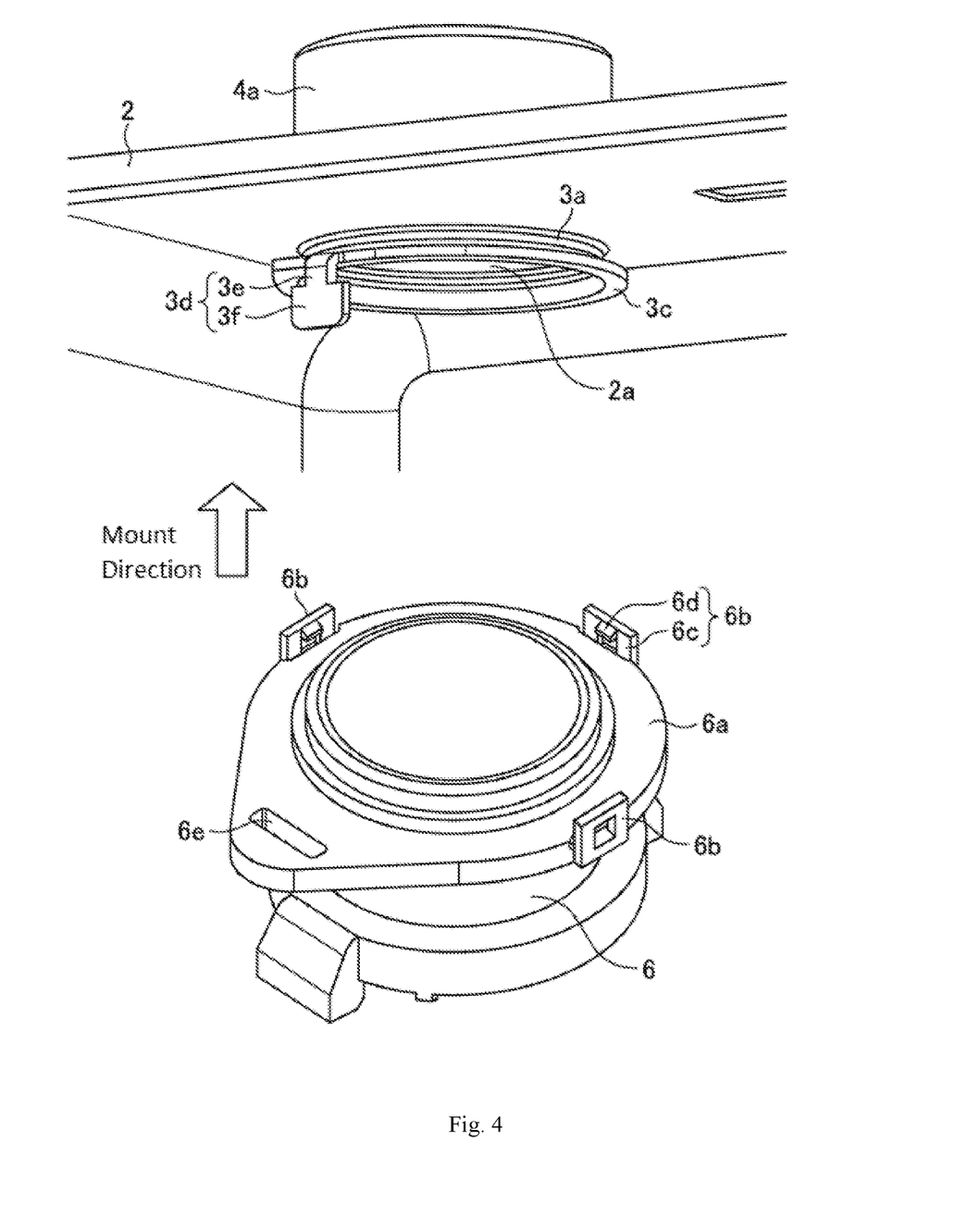
FIG. 4 is a perspective view illustrating the state in which a shutoff valve adaptor is not yet mounted to a sheet metal member.
Figure 5:
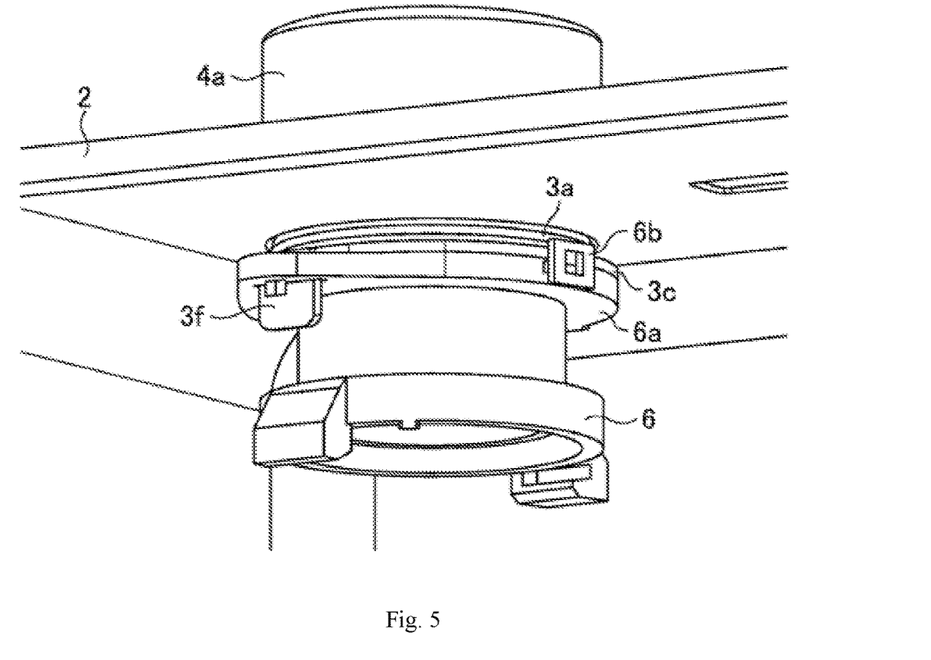
FIG. 5 is a perspective view illustrating the state in which the shutoff valve adaptor has been mounted to the sheet metal member from the state in FIG. 4.

Mounting of the shutoff valve adaptor 6 to the sheet metal member 3a will be described with reference to FIG. 4 and FIG. 5. FIG. 4 is a perspective view of the periphery of the opening portion 2a and illustrates the state in which the shutoff valve adaptor 6 is not yet mounted to the sheet metal member 3a. In addition, FIG. 5 is a perspective view when the shutoff valve adaptor 6 has been mounted to the sheet metal member 3a from the state in FIG. 4.

As illustrated in FIG. 4, the shutoff valve adaptor 6 has a flange portion 6a oriented to the sheet metal member 3a. At the outer edge of the flange portion 6a, three hooking claws 6b project toward the sheet metal member 3a.

The hooking claw 6b has a base portion 6c projecting from the flange portion 6a and a claw portion 6d projecting radially inward from the base portion 6c. The shutoff valve adaptor 6 that is a resin member integrally has the hooking claw 6b.

In addition, as illustrated in FIG. 4, the sheet metal member 3a integrally has a substantially annular hooking target portion 3c that is the peripheral edge portion of the opening portion 2a. The hooking target portion 3c is oriented to the shutoff valve adaptor 6.

When the shutoff valve adaptor 6 is mounted to the sheet metal member 3a, the shutoff valve adaptor 6 configured as described above is pushed against the sheet metal member 3a so that the flange portion 6a makes surface contact with the substantially annular hooking target portion 3c. Then, the claw portion 6d of the hooking claw 6b makes contact with the outer edge of the substantially annular hooking target portion 3c and the hooking claw 6b that is a part of the shutoff valve adaptor 6 that is a resin member elastically deforms so as to warp radially outward. When the shutoff valve adaptor 6 is further pushed against the sheet metal member 3a from this state, the claw portion 6d is moved outward of the gas meter 1 beyond the substantially annular hooking target portion 3c, the hooking claw 6b is biased radially inward due to its own elasticity at this time, and the hooking target portion 3c is sandwiched between the claw portion 6d and the flange portion 6a. This state is illustrated in FIG. 5.

As described above, the shutoff valve adaptor 6 is mounted to the sheet metal member 3a by the snap-fit portion comprising the hooking target portion 3c and the hooking claw 6b having hooked to the hooking target portion 3c. That is, the gas meter 1 has the component mounting structure that uses snap-fitting instead of screwing used conventionally. as illustrated in FIG. 8, FIG. 9, and FIG. 10. In the gas meter 1, the effort of assembly can be reduced because the number of screwing positions is reduced.

Although the mounting of the shutoff valve adaptor 6 to the sheet metal member 3a is illustrated in FIG. 4 and FIG. 5, the mounting of the measuring unit adaptor 8 to the sheet metal member 3b is similar to that illustrated in FIG. 4 and FIG. 5. That is, the measuring unit adaptor 8 also has the flange portion 6a and the hooking claw 6b comprising the base portion 6c and the claw portion 6d, and the sheet metal member 3b also has the substantially annular hooking target portion 3c. Then, the measuring unit adaptor 8 is mounted to the sheet metal member 3b by the snap-fit portion comprising the hooking target portion 3c and the hooking claw 6b having been hooked to the hooking target portion 3c instead of screwing.

In addition, the flange portion 6a has a through-hole 6e, as illustrated in FIG. 4. In addition, as illustrated in FIG. 4, the sheet metal member 3a has a sheet metal piece 3d extending integrally from the hooking target portion 3c toward the shutoff valve adaptor 6. The sheet metal piece 3d has a small piece portion 3e at the one end that is a fixed end connected to the substantially annular hooking target portion 3c and has a large piece portion 3f that is wider than the small piece portion 3e at the other end that is a free end.

When the hooking claw 6b is hooked to the hooking target portion 3c by its own elasticity, the sheet metal piece 3d passes through the through-hole 6e and the large piece portion 3f projects from the flange portion 6a, as illustrated in FIG. 5. In this state, the large piece portion 3f is twisted to make plastic deformation. By causing the large piece portion 3f to support the flange portion 6a using this twisting, the shutoff valve adaptor 6 is firmly mounted to the sheet metal member 3a and, even when the snap-fit portion is broken accidentally, detachment of the shutoff valve adaptor 6 from the sheet metal member 3a can be prevented.

The above twisting is not limited to the mounting of the shutoff valve adaptor 6 to the sheet metal member 3a and may also be used for the mounting of the measuring unit adaptor 8 to the sheet metal member 3b. That is, the measuring unit adaptor 8 also has the through-hole 6e in addition to the flange portion 6a and the hooking claw 6b, and the sheet metal member 3b also has the sheet metal piece 3d comprising the small piece portion 3e and the large piece portion 3f in addition to the hooking target portion 3c.

Figure 6:
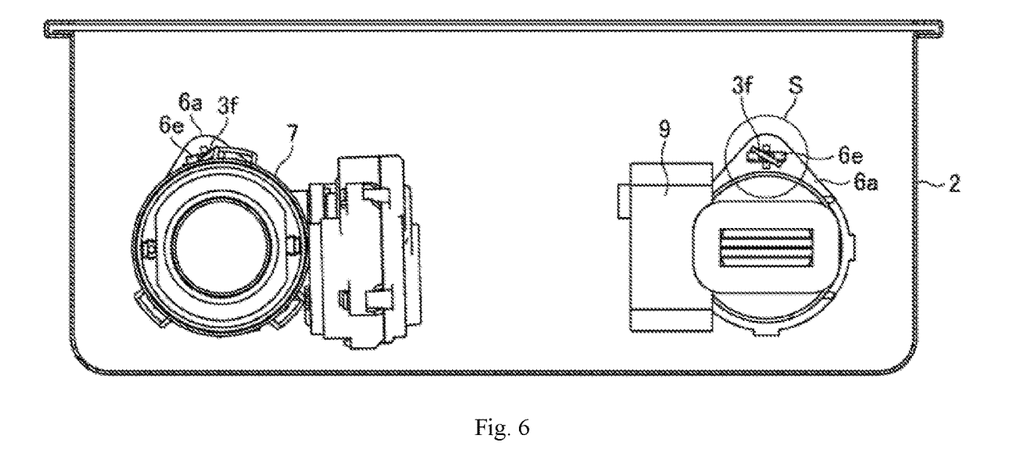
FIG. 6 illustrates the gas meter and a cross section of the case as seen from direction C in FIG. 1.

FIG. 6 illustrates this twisting and a cross section of the case 2 when the gas meter 1 is seen from direction C in FIG. 1. Since the twisting in the sheet metal member 3b to which the measuring unit adaptor 8 is mounted is easier to see than the twisting in the sheet metal member 3a to which the shutoff valve adaptor 6 is mounted in FIG. 6, the twisting in the mounting of the measuring unit adaptor 8 is used for description. In addition, FIG. 7 is an enlarged view of section S in FIG. 6.

Figure 7:
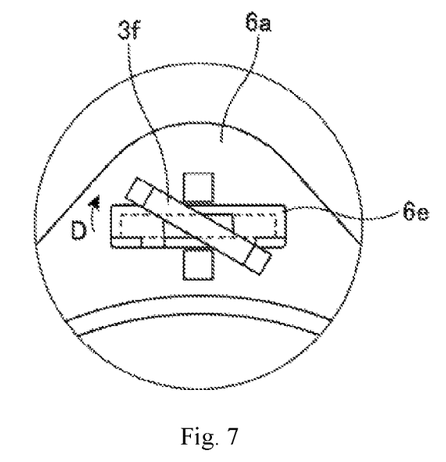
FIG. 7 is an enlarged view of section S in FIG. 6.

Immediately after the sheet metal piece 3d passes through the through-hole 6e, the large piece portion 3f of the sheet metal piece 3d is present in the position in plan view indicated by the dotted line in FIG. 7. At this time, the large piece portion 3*f* does not face the peripheral edge portion (that is, the peripheral edge portion on the side illustrated in FIG. 6 and FIG. 7) oriented to the inside of the gas meter 1 of the peripheral edge portions of the through-hole 6*e*. When the large piece portion 3*f* is twisted in direction D illustrated in FIG. 7 in this state, the large piece portion 3*f* faces the peripheral edge portion of the through-hole 6*e* oriented to the inside of the gas meter 1 as illustrated in FIG. 6 and FIG. 7. The large piece portion 3*f* facing the peripheral edge portion functions as a so-called stopper. Preferably, the twisting angle is approximately 25 degrees to 30 degrees.

Although the gas meter 1 is a USM type gas meter above, the gas meter 1 may be another type of gas meter, such as a film type gas meter, in which the snap-fit portion described above may be used as the structure for mounting a shutoff valve, a measuring unit, and the like.

In addition, the number of the hooking claws 6*b* is not limited to the example in the drawings and may be increased or reduced as appropriate. In addition, the shape of the hooking claw 6*b* may be changed as appropriate as long as the hooking claw 6*b* can be hooked to the hooking target portion 3*c* to form the snap-fit portion.

As described above, in the gas meter 1 according to embodiment 1 of the invention, components such as the shutoff valve adaptor 6 and the measuring unit adaptor 8 are mounted by forming the snap-fit portion comprising the hooking claw 6*b* and the hooking target portion 3*c* instead of screwing. Accordingly, the effort of assembly can be reduced because the number of screwing positions is reduced.

In addition, the shutoff valve adaptor 6 or the measuring unit adaptor 8 that is a resin member has the through-hole 6*e*, the sheet metal member 3*a* or 3*b* has the sheet metal piece 3*d* extending toward the resin member and passing through the through-hole 6*e*, the sheet metal piece 3*d* has the small piece portion 3*e* at one end that is a fixed end and the large piece portion 3*f* at the other end that is a free end, and the large piece portion 3*f* faces the peripheral edge portion of the through-hole 6*e* oriented to the inside of the gas meter 1. In such a structure, the shutoff valve adaptor 6 or the measuring unit adaptor 8 that is a resin member can be mounted firmly and, if the snap-fit portion is broken accidentally, detachment of the shutoff valve adaptor 6 or the measuring unit adaptor 8 can be prevented.

In addition, the shutoff valve 7 or the measuring unit 9 is connected to the shutoff valve adaptor 6 or the measuring unit adaptor 8 that is a resin member. As described above, the shutoff valve adaptor 6 or the measuring unit adaptor 8 can be used as the structure for mounting the measuring unit 9 or the shutoff valve 7.

It should be noted that any component of the embodiment can be modified or any component of the embodiment can be omitted within the scope of the invention.

DESCRIPTION OF REFERENCE NUMERALS AND SIGNS

1: gas meter
2: case
2*a*, 2*b*: opening portion
3*a*, 3*b*: sheet metal member
3*c*: hooking target portion
3*d*: sheet metal piece
3*e*: small piece portion
3*f*: large piece portion
4*a*, 4*b*: connection member
5*a* to 5*d*: O-ring
6: shutoff valve adaptor
6*a*: flange portion
6*b*: hooking claw
6*c*: base portion
6*d*: claw portion
6*e*: through-hole
7: shutoff valve
8: measuring unit adaptor
9: measuring unit

The invention claimed is:

1. A component mounting structure for a gas meter, comprising:
a resin member having an elastically deformable hooking claw; and
a sheet metal member having a hooking target portion that is a peripheral edge portion of an opening portion connecting an inside and an outside of the gas meter, the hooking target portion being present on the inside of the gas meter,
wherein the hooking claw is hooked to the hooking target portion to form a snap-fit portion that mounts the resin member to the sheet metal member,
the resin member has a through-hole,
the sheet metal member has a sheet metal piece extending toward the resin member and passing through the through-hole,
the sheet metal piece has a small piece portion at one end that is a fixed end and a large piece portion at the other end that is a free end, and
the large piece portion faces a peripheral edge portion of the through-hole, the peripheral edge portion being oriented to the inside of the gas meter.

2. The component mounting structure for a gas meter according to claim 1,
wherein a measuring unit or a shutoff valve is connected to the resin member.

3. A gas meter, comprising:
a resin member having an elastically deformable hooking claw; and
a sheet metal member having a hooking target portion that is a peripheral edge portion of an opening portion connecting an inside and an outside of the gas meter, the hooking target portion being present on the inside of the gas meter,
wherein the hooking claw is hooked to the hooking target portion to form a snap-fit portion that mounts the resin member to the sheet metal member,
the resin member has a through-hole,
the sheet metal member has a sheet metal piece extending toward the resin member and passing through the through-hole,
the sheet metal piece has a small piece portion at one end that is a fixed end and a large piece portion at the other end that is a free end, and
the large piece portion faces a peripheral edge portion of the through-hole, the peripheral edge portion being oriented to the inside of the gas meter.

4. The gas meter according to claim 3,
wherein a measuring unit or a shutoff valve is connected to the resin member.

* * * * *